US009507966B2

(12) United States Patent
Nakano et al.

(10) Patent No.: US 9,507,966 B2
(45) Date of Patent: Nov. 29, 2016

(54) INFORMATION PROCESSING DEVICE AND OPERATION CONTROL METHOD

(71) Applicant: KABUSHIKI KAISHA TOSHIBA, Minato-ku, Tokyo (JP)

(72) Inventors: Toshiya Nakano, Hamura Tokyo (JP); Yoshio Matsuoka, Ome Tokyo (JP); Yoshihiro Kaneko, Fussa Tokyo (JP); Hideaki Uzawa, Hamura Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 23 days.

(21) Appl. No.: 14/559,657

(22) Filed: Dec. 3, 2014

(65) Prior Publication Data

US 2015/0379308 A1    Dec. 31, 2015

(30) Foreign Application Priority Data

Jun. 25, 2014    (JP) .................................. 2014-130245

(51) Int. Cl.
*G06F 21/81* (2013.01)
*G06F 9/445* (2006.01)
*G06F 21/30* (2013.01)
*G06F 21/50* (2013.01)
(Continued)

(52) U.S. Cl.
CPC ................ *G06F 21/81* (2013.01); *G06F 9/445* (2013.01); *G06F 21/305* (2013.01); *G06F 21/50* (2013.01); *G06F 21/552* (2013.01); *G06F 21/60* (2013.01); *G06F 21/88* (2013.01); *H04W 12/12* (2013.01); *G06F 2221/03* (2013.01); *G06F 2221/2111* (2013.01); *G06F 2221/2143* (2013.01)

(58) Field of Classification Search
CPC ........ G06F 21/81; G06F 21/50; G06F 21/60; G06F 9/445; G06F 21/305; G06F 2221/03; G06F 2221/2143; G06F 21/552; G06F 21/88; G06F 2221/2111; H04L 29/06047
See application file for complete search history.

(56) References Cited

U.S. PATENT DOCUMENTS 6,928,541 B2    8/2005    Sekiguchi
7,209,874 B2    4/2007    Salmonsen
(Continued)

FOREIGN PATENT DOCUMENTS

JP    2001-356913    12/2001
JP    2005-518603    6/2005
(Continued)

OTHER PUBLICATIONS

Extended European Search Report for counterpart European Application No. 14194023.9, mailed Nov. 23, 2015, in 11 pages.

*Primary Examiner* — Joseph P Hirl
*Assistant Examiner* — J. Brant Murphy
(74) *Attorney, Agent, or Firm* — Knobbe, Martens, Olson & Bear LLP

(57) ABSTRACT

According to one embodiment, a firmware stored in a ROM in an information processing device connects the information processing device to a first server through a network, and downloads a client program into a volatile memory in the information processing device from the first server. Also, the firmware launches the client program to connect the information processing device and a second server through the network, and turns off the power of the information processing device to erase content in the volatile memory, when the information processing device is disconnected from the network after connection between the information processing device and the second server is established.

13 Claims, 8 Drawing Sheets

(51) Int. Cl.
*G06F 21/60* (2013.01)
*G06F 21/55* (2013.01)
*G06F 21/88* (2013.01)
*H04W 12/12* (2009.01)

(56) References Cited

U.S. PATENT DOCUMENTS

| | | | |
|---|---|---|---|
| 7,269,543 | B2 | 9/2007 | Salmonsen et al. |
| 7,505,889 | B2 | 3/2009 | Salmonsen et al. |
| 7,647,141 | B2 | 1/2010 | Foster et al. |
| 7,783,281 | B1* | 8/2010 | Cook ............... G06F 21/88 455/410 |
| 7,848,913 | B2 | 12/2010 | Salmonsen |
| 2001/0052069 | A1 | 12/2001 | Sekiguchi |
| 2003/0163484 | A1 | 8/2003 | Salmonsen et al. |
| 2003/0191623 | A1 | 10/2003 | Salmonsen |
| 2003/0220781 | A1 | 11/2003 | Salmonsen et al. |
| 2003/0225568 | A1 | 12/2003 | Salmonsen |
| 2004/0024580 | A1 | 2/2004 | Salmonsen et al. |
| 2004/0049624 | A1 | 3/2004 | Salmonsen |
| 2004/0049797 | A1 | 3/2004 | Salmonsen |
| 2004/0054689 | A1 | 3/2004 | Salmonsen et al. |
| 2005/0246075 | A1 | 11/2005 | Foster et al. |
| 2007/0005334 | A1 | 1/2007 | Salmonsen |
| 2007/0174414 | A1 | 7/2007 | Song et al. |
| 2009/0013165 | A1* | 1/2009 | Chow ............... G06F 9/4406 713/2 |
| 2009/0019276 | A1 | 1/2009 | Song et al. |
| 2009/0019277 | A1 | 1/2009 | Song et al. |
| 2009/0037722 | A1* | 2/2009 | Chong ............... G06F 1/24 713/2 |
| 2009/0125732 | A1* | 5/2009 | Oya ............... H04L 12/66 713/300 |
| 2010/0185844 | A1* | 7/2010 | George ............... G06F 9/4401 713/2 |
| 2011/0314409 | A1* | 12/2011 | Yano ............... G06F 9/4445 715/778 |
| 2012/0072989 | A1* | 3/2012 | Sakai ............... G06F 21/567 726/24 |
| 2012/0151201 | A1* | 6/2012 | Clerc ............... G06F 9/441 713/2 |
| 2012/0303762 | A1* | 11/2012 | Geiser ............... G06F 9/4416 709/219 |
| 2013/0086405 | A1* | 4/2013 | Chou ............... H04L 12/24 713/324 |
| 2013/0291062 | A1* | 10/2013 | Bursell ............... G06F 21/44 726/4 |
| 2014/0280436 | A1* | 9/2014 | Larkin ............... G06F 9/4843 709/201 |
| 2014/0344806 | A1* | 11/2014 | Suresh ............... G06F 9/4445 718/1 |

FOREIGN PATENT DOCUMENTS

| | | |
|---|---|---|
| JP | 2007-525756 | 9/2007 |
| JP | 2011-223355 | 11/2011 |
| WO | WO 03/073277 | 9/2003 |
| WO | WO 2005/081122 | 9/2005 |

\* cited by examiner

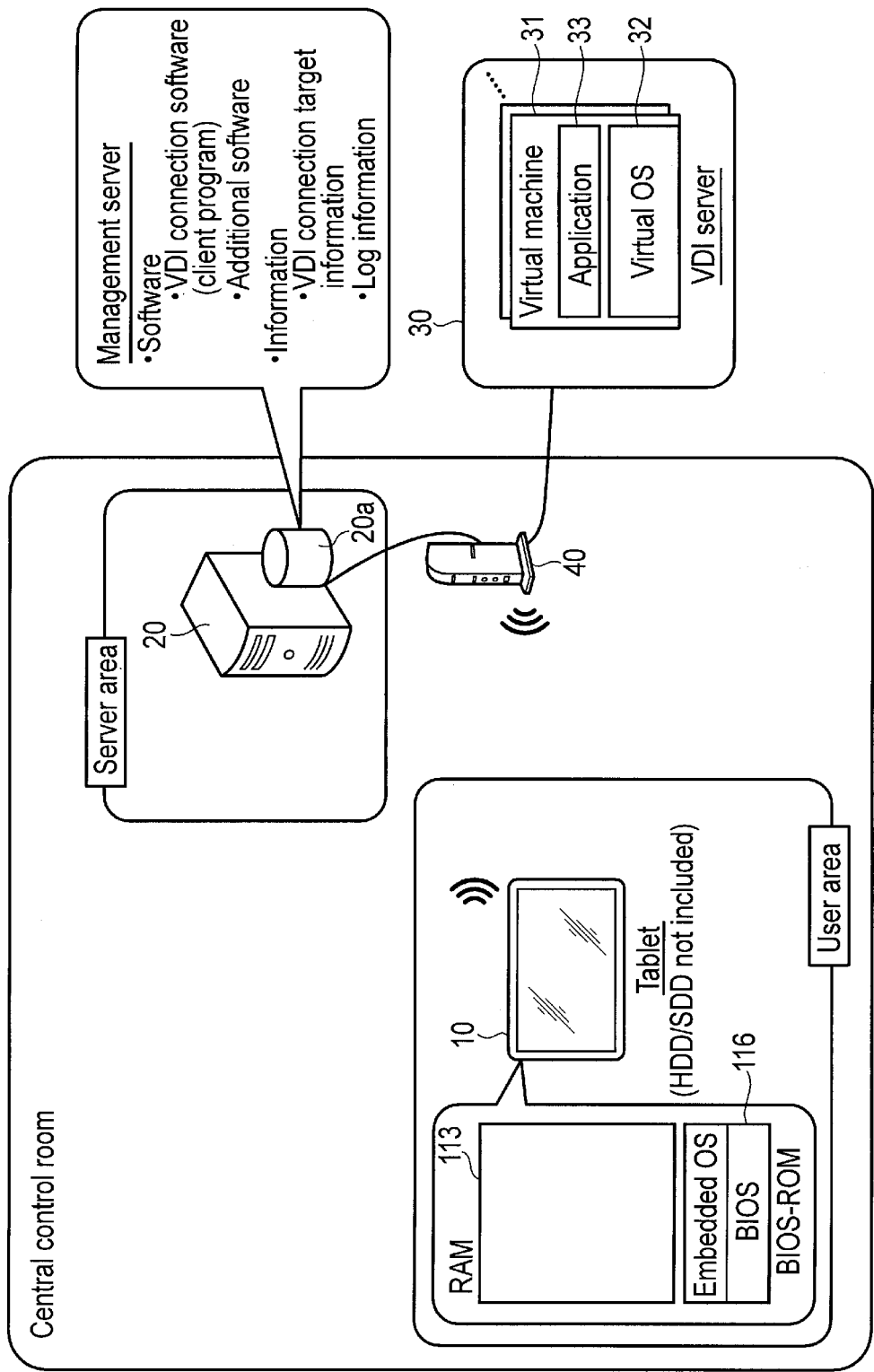
F I G. 1

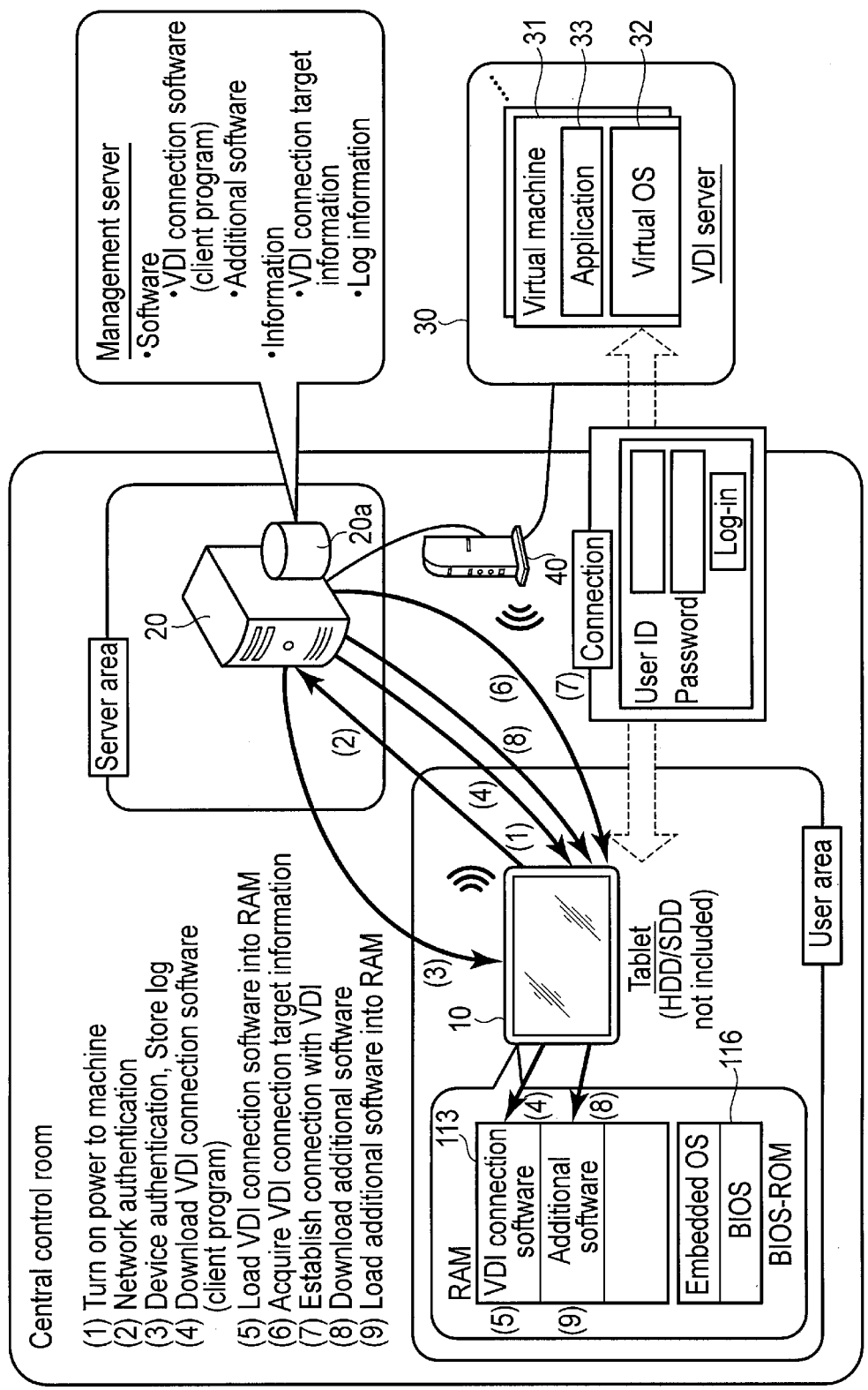
F I G. 2

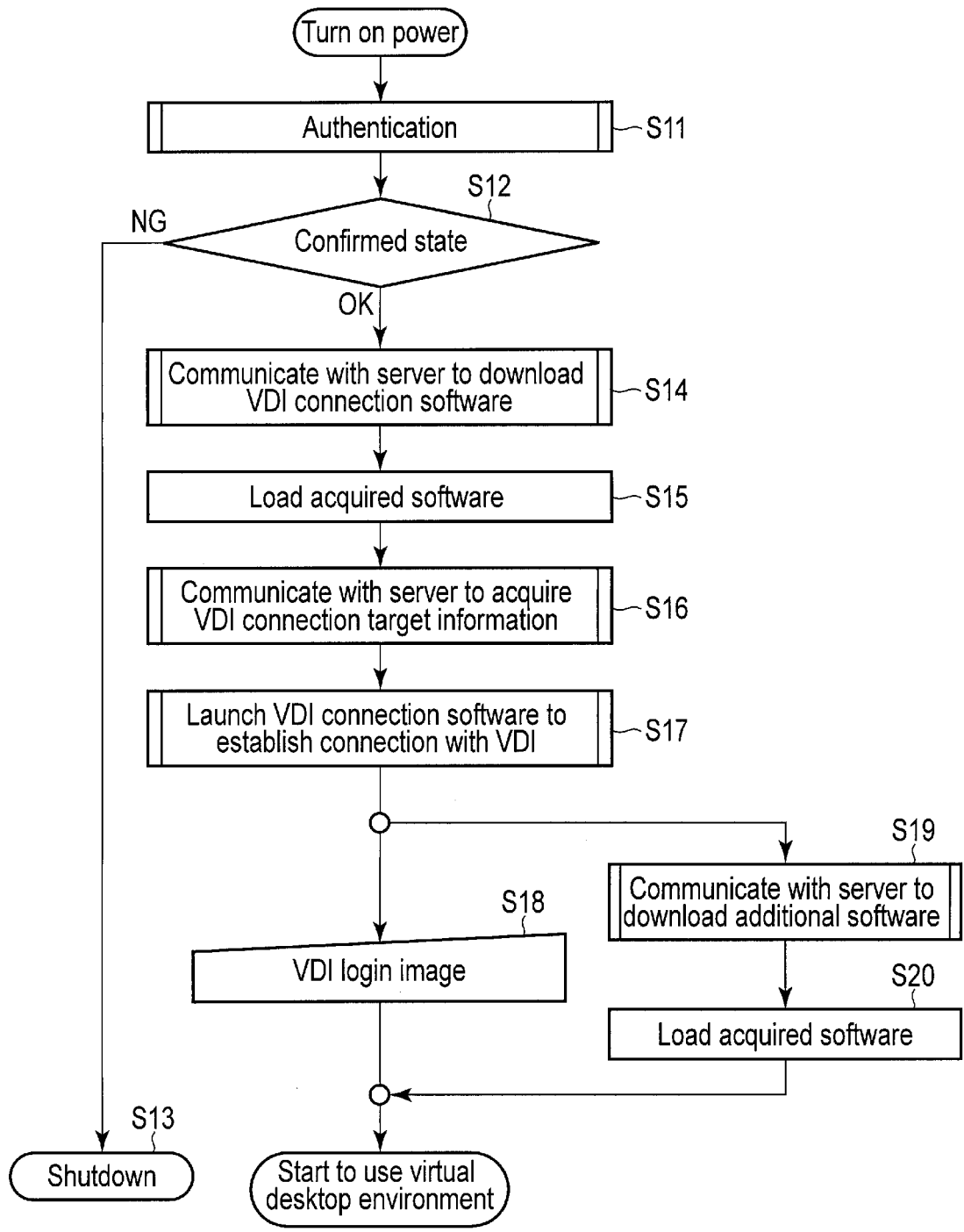
F I G. 4

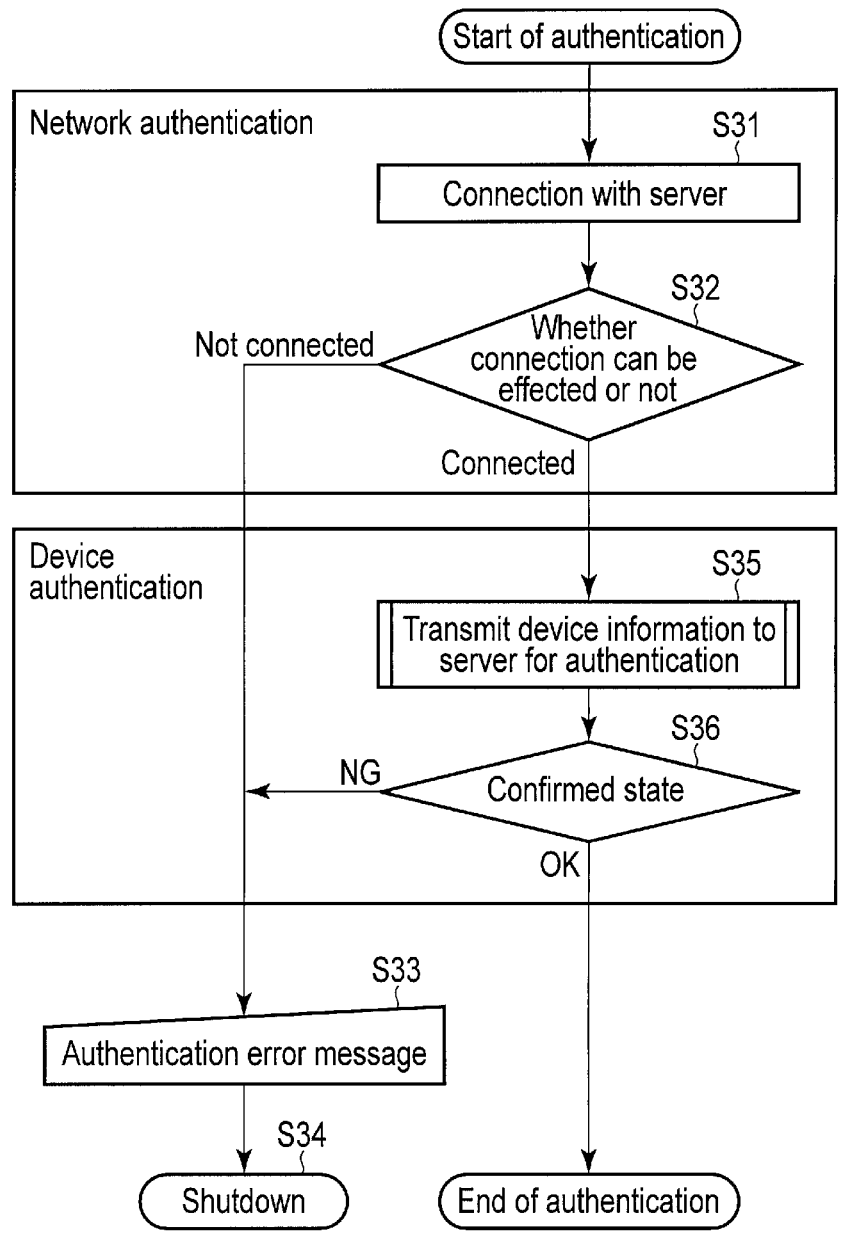
F I G. 5

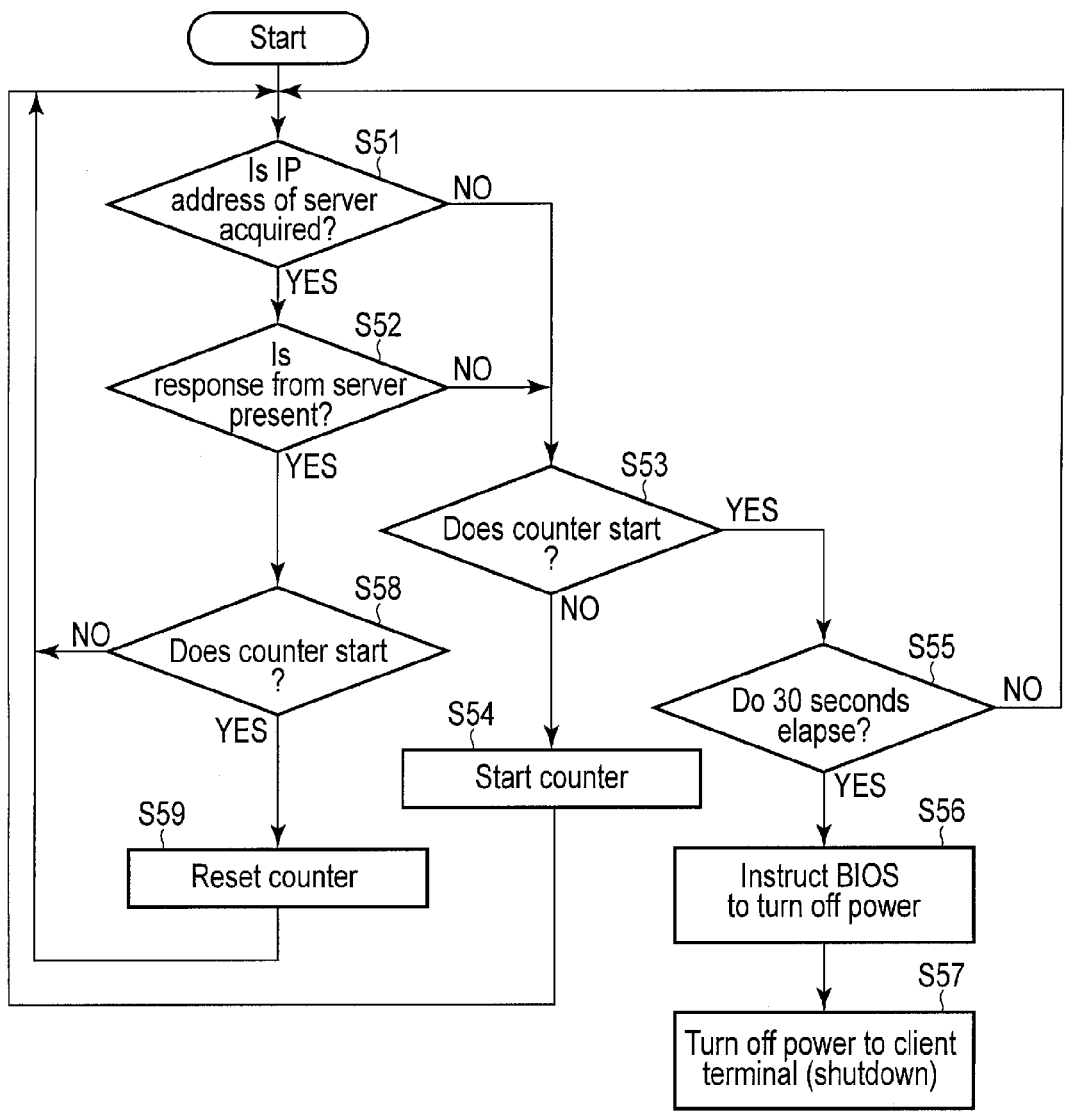
F I G. 7

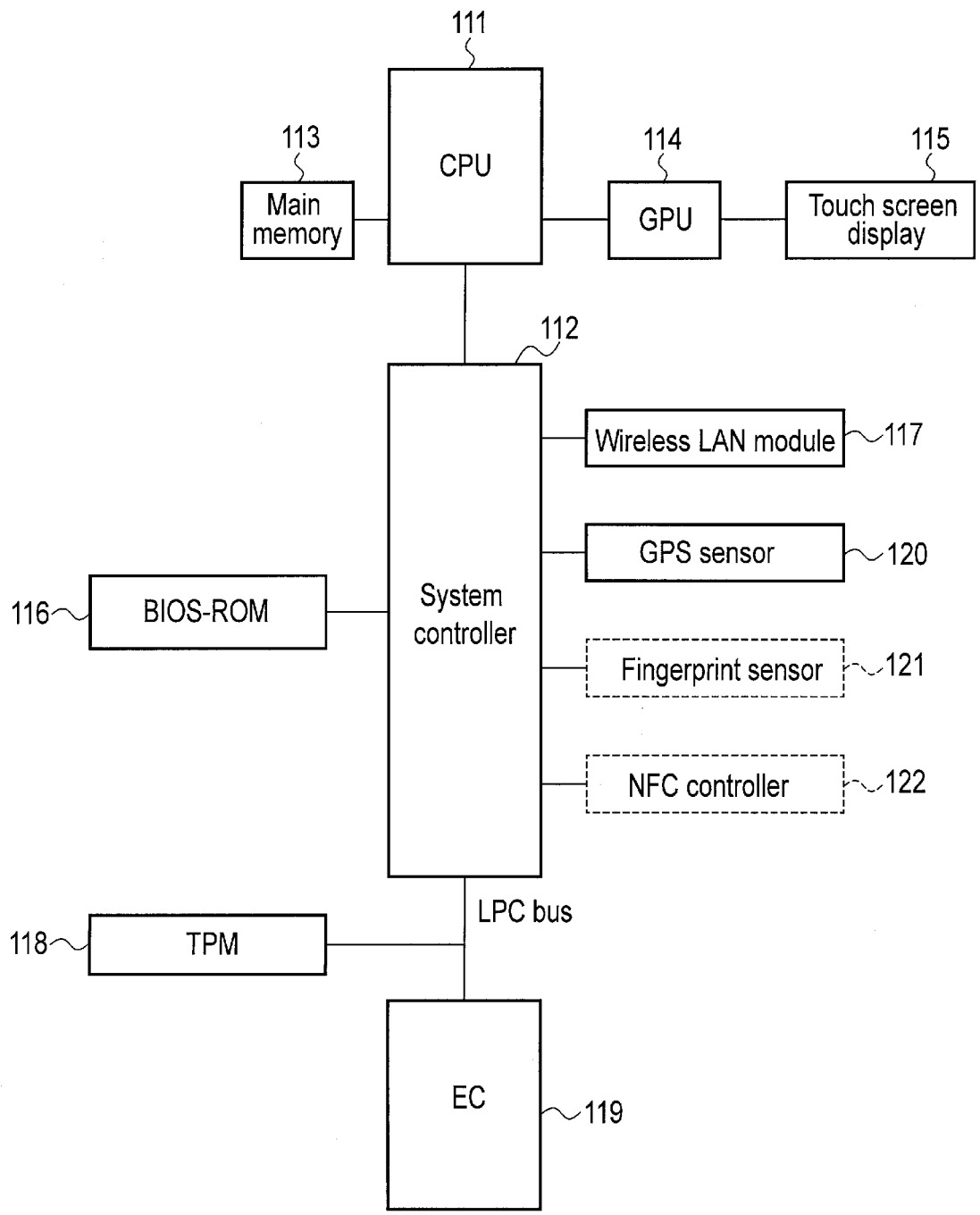
F I G. 8

INFORMATION PROCESSING DEVICE AND OPERATION CONTROL METHOD

CROSS-REFERENCE TO RELATED APPLICATIONS

This application is based upon and claims the benefit of priority from Japanese Patent Application No. 2014-130245, filed Jun. 25, 2014, the entire contents of which are incorporated herein by reference.

FIELD

Embodiments described herein relate generally to a technique for security management of a computer.

BACKGROUND

In recent years, a larger number of personal computers (client devices) have been stolen or lost, thus causing an information leak.

Therefore, in companies carrying on enterprises which need to be strictly managed in information, such as infrastructure and medical enterprises, thin-client devices have been used more frequently.

However, in a conventional thin-client device, client software for communicating with a server, a required minimum operating system, etc., are launched from an internal storage in the client device. Therefore, setting information necessary for connection with the server or other information may be retained in the internal storage. Thus, if the thin-client device is stolen or lost, it may cause an information leak.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram illustrating a system including an information processing device (client device) according to an embodiment.

FIG. 2 is an exemplary block diagram for explaining processing for connecting the information processing device according to the embodiment and a virtual desktop infrastructure (VDI) server.

FIG. 4 is an exemplary flowchart illustrating a procedure of a connection processing which is executed by the information processing device according to the embodiment.

FIG. 5 is an exemplary flowchart illustrating a procedure of an authentication processing which is executed by the information processing device according to the embodiment.

FIG. 7 is an exemplary flowchart illustrating a procedure of a network monitoring processing which is executed by the information processing device according to the embodiment.

FIG. 8 is an exemplary block diagram illustrating a configuration example of the information processing device according to the embodiment.

DETAILED DESCRIPTION

Figure 3:
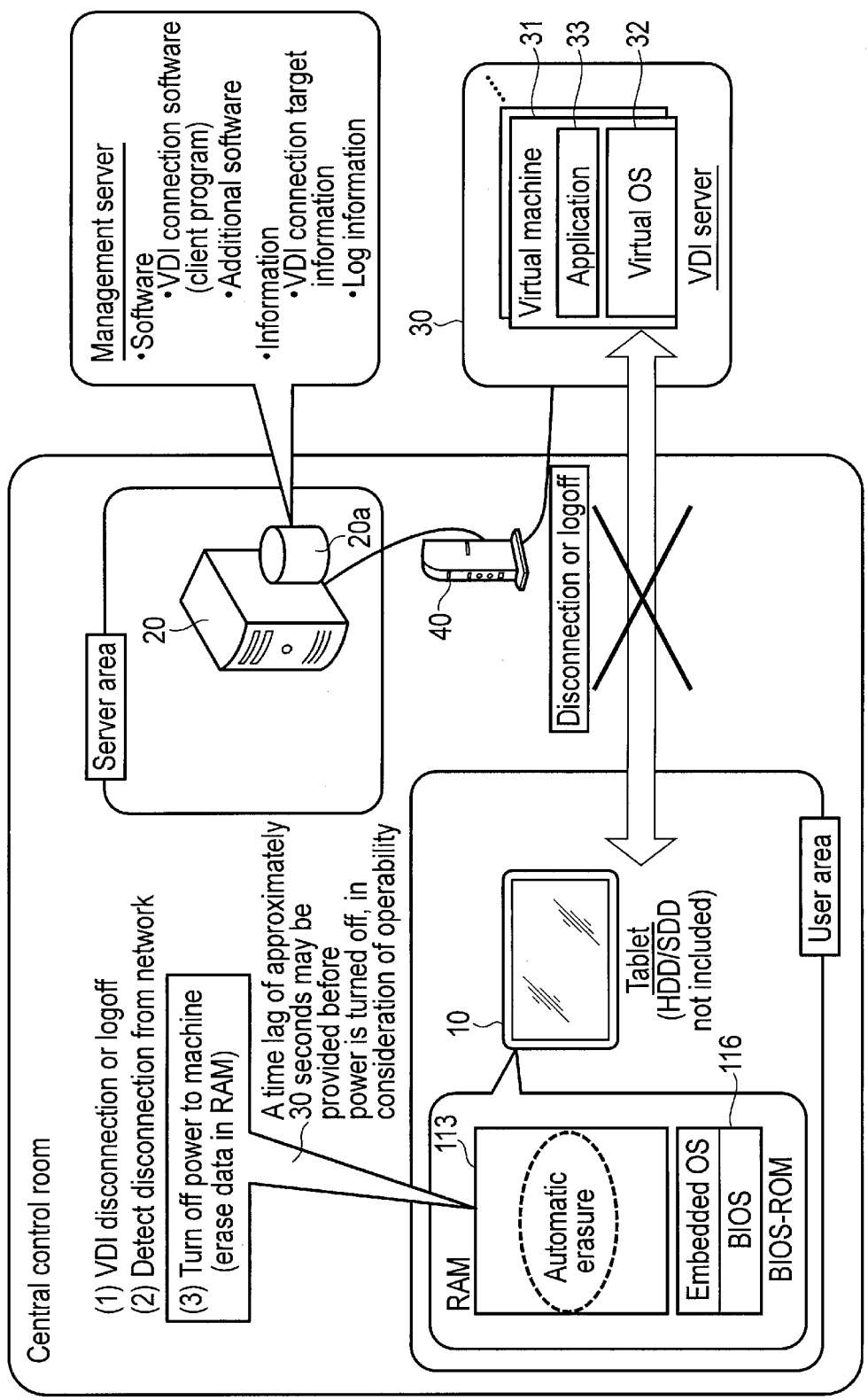
FIG. 3 is an exemplary block diagram for explaining a power-off processing which is executed when the information processing device according to the embodiment is disconnected from a network.

Various embodiments will be described hereinafter with reference to the accompanying drawings.

In general, according to one embodiment, an information processing device includes a processor, a volatile memory and a ROM storing firmware including a basic input output system (BIOS). The processor executes firmware instructions of connecting the information processing device to a first server through a network. The processor further executes firmware instructions of downloading a client program from the first server into the volatile memory. The client program is configured to communicate with a second server which provides a virtual desktop environment, and to receive a virtual desktop image from the second server. Furthermore, the processor executes firmware instructions of launching the client program in order to connect the information processing device and the second server to each other through the network. Also, the processor executes firmware instructions of turning off the power of the information processing device to erase content in the volatile memory, when the information processing device is disconnected from the network after the connection between the information processing device and the second server is established.

First of all, a system including an information processing device according to an embodiment will be explained with reference to FIG. 1. The information processing device functions as a client device which communicates with a server configured to provide a virtual desktop environment. As the client device, a clamshell device such as a notebook personal computer or a slate device such as a tablet computer may be applied. The following explanation is given with respect to the case where the client device is a slate device, i.e., a tablet device (tablet computer) 10.

In the embodiment, the tablet device 10 is used in, for example, a central control room in a facility which needs a strict information management. As an example of the facility, a power plant is present.

In a server area in the central control room, some servers including a management server 20 are provided. Workers in the central control room, i.e., users, each use a tablet device 10 to perform operations. The tablet device 10 can communicate with the management server 20 through a wireless network such as a wireless LAN. In this case, the tablet device 10 may be connected to the management server 20 through a wireless LAN router 40. Also, the tablet device 10 can also communicate with a server 30 through the wireless network. The server 30 provides a virtual desktop environment to each of a plurality of client devices including the tablet device 10.

There are provided a plurality of kinds of techniques for achieving desktop virtualization for providing a virtual desktop environment. As one of those techniques, a virtual desktop infrastructure (VDI) is well known.

In the embodiment, the VDI may be applied as a technique for achieving desktop virtualization. In this case, the server 30 functions as a VDI server configured to provide a virtual desktop environment, using the VDI. Also, the tablet device 10 functions as a VDI client device.

As models which can be used to achieve VDI servers 30, a blade PC type VDI server, a virtual machine type VDI server and a terminal type VDI server are present. If the virtue machine type VDI server is applied to achieve the VDI server 30, a plurality of virtual machines 31 are executed in the VDI server 30. One of the plurality of virtual machines 31 is allocated to the tablet device 10. Each of the virtual machines 31 includes a virtual OS (client desktop OS) 32 and an application program that runs on the virtual OS 32. The tablet device 10 may be connected to one of the virtual machines 31 on the VDI server 30 through the wireless LAN router 40.

In the embodiment, in order to prevent information leak even if a tablet device 10 is stolen, the tablet device 10 does not include an internal storage (hard disk drive (HDD), solid-state drive (SSD)), and operates using a basic input output system (BIOS)-based virtual desktop infrastructure (VDI).

In order to achieve the BIOS-based VDI, firmware including the BIOS has a network communication function of connecting with a wire network or a wireless network. The firmware including the BIOS is stored in a BIOS-ROM 116 in the tablet device 10. The firmware may be made of a BIOS and an embedded OS having the network communication function. The BIOS can boot the embedded OS in the BIOS-ROM 116. As the BIOS, a UEFI BIOS may be applied. The BIOS-ROM 116 may be made of a flash EEPROM to enable the firmware to be updated.

The tablet device 10 can communicate with the management server 20 through the wireless network, using only the firmware in the BIOS-ROM 116.

The management server 20 has a function of limiting client devices usable in the central control room only to a group of devices registered in advance, in order to prevent unauthorized devices from being used in the central control room, i.e., from accessing the VDI server 30. Also, the management server 20 has a function of providing information and a program necessary to communicate with the VDI server 30 to each of client devices verified and determined as authorized client devices.

To be more specific, the management server 20 includes a storage 20a. The storage 20a stores VDI connection software, additional software, VDI connection target information, etc. The VDI connection software is a client program (VDI client program) configured to communicate with a server which provides a virtual desktop environment (i.e., the VDI server 30 in this case), and to receive a virtual desktop image from the server.

As described above, the tablet device 10 does not include an internal storage, and downloads a VDI connection software (client program) from the management server 20 into a volatile memory (RAM) 113 in the tablet device 10.

It is also possible to apply a method in which the VDI connection software (client program) is stored in advance in the BIOS-ROM 116. However, in this case, it is necessary to prepare a ROM having a large capacity as the BIOS-ROM 116. In addition, in the method in the client program is stored in advance in the BIOS-ROM 116, the kinds of usable client programs are limited.

In the embodiment, as described above, the VDI connection software (client program) is downloaded from the management server 20 into the volatile memory 113 in the tablet device 10. Therefore, an arbitrary kind of client program can be executed on the tablet device 10 simply by changing the kind of a client program to be stored in the storage 20a of the management server 20.

The VDI connection target information is information necessary for connection with the VDI server 30. The VDI connection target information may include the network address (IP address) of the VDI server 30 and credential information (user ID and password) for logging in on the VDI server 30.

The embedded OS in the firmware launches the VDI connection software in order to connect the tablet device 10 to the VDI server 30 through the network. The VDI connection software (client program) can automatically log in on the VDI server 30, using the credential information (user ID and password).

After logging in on the VDI server 30, the VDI connection software (client program) can receive a virtual desktop image from the VDI server 30 through the network (the wireless network in this case). The virtual desktop image is displayed on a display (touch screen display) of the tablet device 10. Also, the VDI connection software can transmit data input from an input device (operation information corresponds to a user operation of an input device) to the VDI server 30 through the network (the wireless network in this case). The data (operation information) includes data input from a keyboard (or a virtual keyboard), data input from a mouse, data (touch operation information) input from the touch screen display, etc.

In such a manner, the VDI connection software (client program) is loaded only by the firmware, from the management server 20 into the RAM 113 in the tablet device 10. Therefore, the tablet device 10 does not need an internal storage. Thus, the risk in which data or a unique program may be stolen is greatly reduced. Furthermore, the firmware necessarily includes connection information for connection with the management server 20 (a network address of the management server 20, a password for connection with the management server 20). Since a data amount of the connection information is small, the information can be stored in a trusted platform module (TPM) having high confidentiality or a specific chip, thus improving security. Also, the connection information may include a service set ID (SSID) of the wireless LAN router 40.

Furthermore, as described above, in the embodiment, an arbitrary kind of client program can be executed on the tablet device 10.

The additional software is an additional application program to be executed on the tablet device 10. The firmware downloads the additional software from the management server 20 into the RAM 113. Thereby, as occasion demands, various functions can be added to the tablet device 10.

In addition, the firmware also has a function of automatically turning off the power of the tablet device 10 if the tablet device 10 is disconnected from the network (the wireless network in this case) after the connection between the tablet device 10 and the VDI server 30 is established. When the power of the tablet device 10 is automatically turned off, information items which must not be stolen are all automatically erased from the RAM 113 of the tablet device 10. To be more specific, in the embodiment, since all information items (programs or data downloaded from the management server 20) are present in the RAM 113 of the tablet device 10, they are erased at the same time as supplying of a power supply voltage to the RAM 113 is stopped at the time of turning off the power. If someone tries to bring out the tablet device 10 from a facility, the tablet device 10 is disconnected from the network. At this time, all information items are automatically erased from the RAM 113 of the tablet device 10. Therefore, even if the tablet device 10 is brought out from the facility, it is possible to prevent an information leak.

Processing for determining whether the tablet device 10 is disconnected from the network may be executed by the firmware (e.g., the above embedded OS). As a method of determining whether the tablet device 10 is disconnected form the network or not, for example, a method of determining whether or not connection (VDI connection) between the tablet device 10 and the VDI server 30 is released (VDI disconnection) may be applied. The VDI connection is released (VDI disconnection), for example, when the tablet device 10 is taken out from the facility (i.e., it is located outside a communication range) or it is logged out from the VDI server 30.

If the tablet device 10 is taken out from the facility (i.e., it is located outside the communication range), not only the connection (VDI disconnection) between the tablet device 10 and the VDI server 30, but that between the tablet device 10 and the management server 20 is released. Therefore, it may be set that the firmware (e.g., the above embedded OS) periodically communicates with the management server 20, and it is determined that the VDI connection is released, if the firmware is continuously unable to communicate with the management server 20 for a given time period or more. Furthermore, a GPS sensor mounted on the tablet device 10 can be applied to determination on whether or not the tablet device 10 is moved from a facility to the outside thereof (it is located outside the communication range).

Alternatively, processing for determining whether or not the tablet device 10 is disconnected from the network may be executed by the above additional software. In this case, the additional software may execute processing for determining whether reception of virtual desktop images from the VDI server 30 is stopped for a threshold time or more to determine whether or not the VDI connection between the tablet device 10 and the VDI server 30 is released (VDI disconnection). For example, the additional software may detect whether or not reception of the virtual desktop images from the VDI server 30 is stopped, by communicating with the VDI connection software (client program).

Next, with reference to FIG. 2, processing for connecting the tablet device 10 and the VDI server 30 to each other will be explained.

(1) The tablet device 10 (machine) is powered on when a power switch of the tablet device 10 is operated by the user.

(2) The firmware of the tablet device 10 is executed. Communication between the firmware and the management server 20 starts, and a network authentication processing for determining whether or not to permit the tablet device 10 to establish connection with the management server 20 through the network is executed. If the firmware of the tablet device 10 has correct connection information (the network address of the management server 20, the password) for connecting to the management server 20, the firmware of the tablet device 10 can be connected to the management server 20 through the network (as success of the network authentication processing).

(3) Then, a device authentication processing for preventing use of an unauthorized device is executed. In this case, the firmware (e.g., the above embedded OS) transmits to the management server 20, device information which can identify the tablet device 10, for example, device ID (a serial number, etc.) of the tablet device 10 or a certificate which the tablet device 10 has. In the management server 20, device information items associated with usable client devices, respectively, are registered in advance. The management server 20 determines whether device information from the tablet device 10 conforms to one of device information items registered in advance (device authentication processing). The management server 20 stores log information indicating whether the device authentication processing succeeds or not, in the storage 20a of the management server 20. Also, the firmware (e.g., the above embedded OS) may store log information indicating whether the device authentication processing succeeds or not, in the RAM 113 of the tablet device 10.

(4) If the device authentication processing succeeds, i.e., it is verified that the tablet device 10 is a device having correct device information, the firmware (e.g., the embedded OS) downloads VDI connection software (client program) from the management server 20.

(5) The firmware (e.g., the embedded OS) loads the VDI connection software (client program) into the RAM 113.

(6) The firmware (e.g. the embedded OS) acquires VDI connection target information from the management server 20. In this case, VDI connection target information associated with device information registered and conforming to the device information of the tablet device 10 is transmitted from the management server 20 to the tablet device 10. The VDI connection target information, as described above, includes the network address (IP address) of the VDI server 30. Furthermore, the VDI connection target information may include credential information (user ID and password) for logging in on the VDI server 30.

(7) The firmware (e.g., the above embedded OS) executes the VDI connection software (client program) on the RAM 113 to connect the tablet device 10 and the VDI server 30 to each other. The VDI connection software (client program) transmits a connection request (login request) to the VDI server 30, using the network address (IP address) included in the VDI connection target information. Furthermore, the VDI connection software (client program) may input the user ID and password included in the VDI connection target information to a user ID input field and a password input field in a VDI login screen provided by the VDI server 30. It can thereby automatically log in on the VDI server 30. As a result, connection (VDI connection) between the tablet device 10 and the VDI server 30 is established.

(8) The firmware (e.g., the above embedded OS) downloads additional software from the management server 20.

(9) The firmware (e.g., the above embedded OS) loads the additional software into the RAM 113, and executes it.

Next, with reference to FIG. 3, a power-off processing to be executed when the tablet device 10 is disconnected from the network will be explained.

(1) For example, if the tablet device 10 is externally brought out, the connection between the tablet device 10 and the VDI server 30 is released (VDI disconnection). Also, the tablet device 10 enters a logoff state in which reception of screen image information (virtual desktop image) from the VDI server 30 is stopped.

(2) The firmware (e.g., the embedded OS) or the additional software detects that the tablet device 10 is disconnected from the network.

(3) In the case where the embedded OS or the additional software detects disconnection from the network, the firmware (e.g., the BIOS) transmits a power-off command to a power supply controller in the tablet device 10 to turn off the power of the tablet device 10. Thereby, information in the RAM 113 is automatically erased.

Also, it may be set that in the case where the tablet device 10 is made to enter the logoff state by a logoff operation performed by the user of the client device 10, the power of the tablet device 10 is turned off.

Next, with reference to the flowchart of FIG. 4, a procedure of connection processing to be executed by the tablet device 10 will be explained.

When the power of the tablet device 10 is turned on, the BIOS boots the embedded OS in the BIOS-ROM 116. Then, authentication processing is executed between the embedded OS and the management server 20 (step S11). In the step S11, the above network authentication processing and device authentication processing may be executed.

The embedded OS confirms a result of the authentication processing (step S12). If the authentication processing fails, the embedded OS transmits a power-off request to the BIOS, and the BIOS turns off the power of the tablet device 10 (shutdown) (step S13).

On the other hand, if the authentication processing succeeds, the embedded OS executes communication with the management server 20 to download VDI connection software from the management server 20 into the RAM 113 (step S14). The VDI connection software is loaded into the RAM 113 (step S15). The embedded OS executes communication with the management server 20 to acquire from the management server 20 VDI connection target information including credential information for connection with the VDI server 30 (step 16).

Then, the embedded OS launches the VDI connection software in the RAM 113 in order to connect the tablet device 10 and the VDI sever 30 (a virtual machine 31 in the VDI server 30) to each other (step S17). In the step S17, the launched VDI connection software transmits a connection request (login request) to the VDI server 30, using the network address (IP address) included in the VDI connection target information. Furthermore, the VDI connection software inputs credential information included in the VDI connection target information to the VDI login screen to automatically log in on the VDI server 30.

In parallel with processing for logging in on the VDI server 30, the embedded OS executes communication with the management server 20 to download additional software from the management server 20 into the RAM 113 (step S19). The additional software is loaded into the RAM 113 (step S20). The additional software is launched by the embedded OS.

The flowchart of FIG. 5 shows an example of a procedure of the authentication processing to be executed in the step S11 in FIG. 4.

The embedded OS starts processing for connecting the tablet 10 and the management server 20 to each other through the network, using connection information for connection with the management server 20 (step S31). Then, the embedded OS confirms whether the network authentication processing succeeds or not, i.e., whether the tablet device 10 is permitted to be connected to the management server 20 or not (step S32).

If the tablet device 10 is not permitted to be connected to the management server 20, the embedded OS displays an authentication error message on a screen of the tablet device 10 (step S33). Then, the embedded OS notifies the BIOS that an authentication error occurs. The BIOS turns off the power of the tablet device 10 (shutdown) (step S34).

If the tablet device 10 is permitted to be connected to the management server 20, the embedded OS transmits the device information of the tablet device 10, for example, the device ID (serial number) of the tablet device 10 and the certificate which the tablet device 10 has, to the management server 20, in order for the management server 20 to execute device authentication processing for determining whether the tablet device 10 is a device registered in the management server 20 (step S35). Then, the embedded OS confirms whether the device authentication processing succeeds or not (step S36).

If the device authentication processing does not succeed, the embedded OS displays an authentication error message on the screen of the tablet device 10 (step S33). Then, the embedded OS notifies the BIOS that an authentication error occurs. The BIOS turns off the power of the tablet device 10 (shutdown) (step S34).

Figure 6:
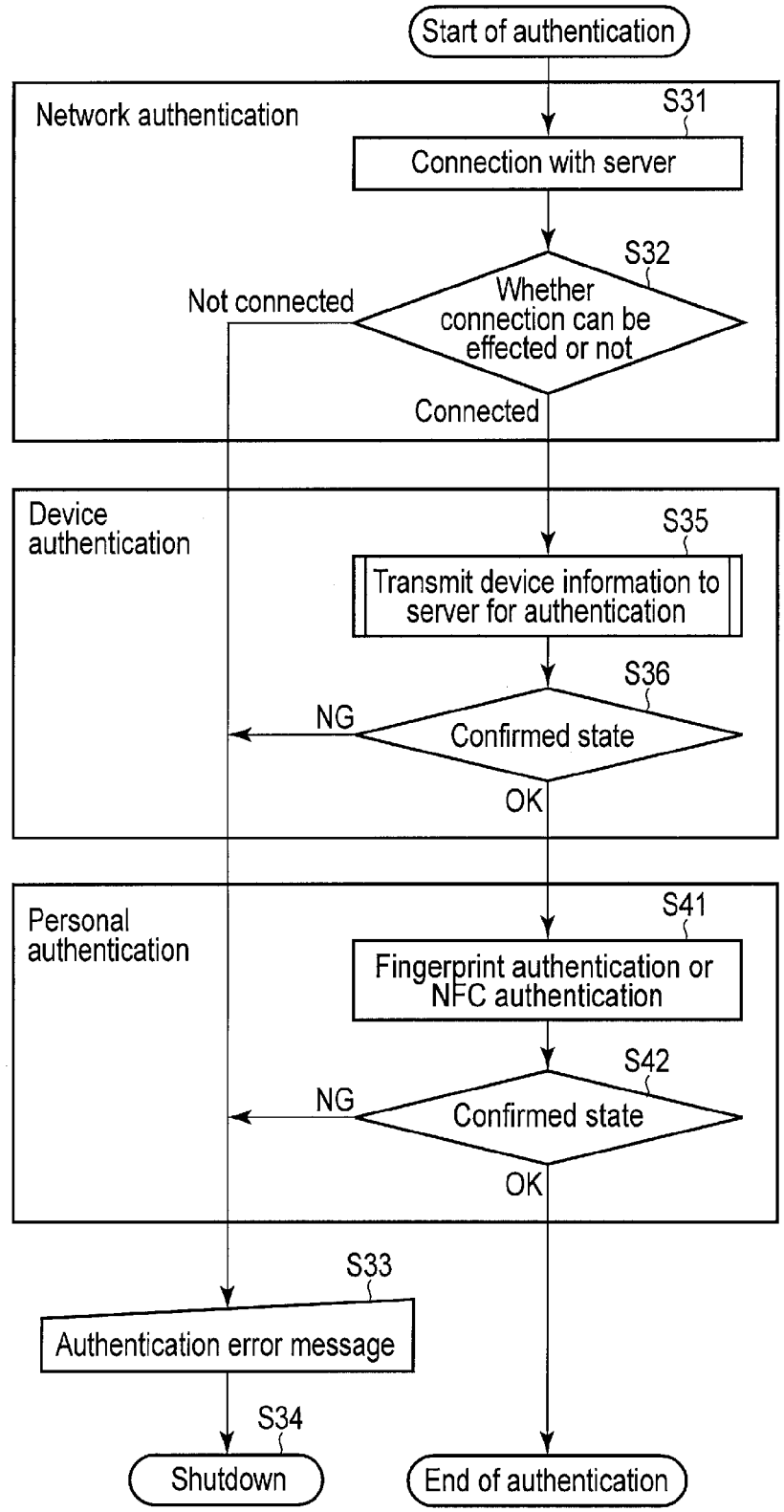
FIG. 6 is an exemplary flowchart illustrating another procedure of the authentication processing which is executed by the information processing device according to the embodiment.

The flowchart of FIG. 6 shows another example of the authentication processing to be executed in the step S11 in FIG. 4.

In the authentication processing as shown in FIG. 6, not only the above network authentication processing and the device authentication processing, but personal authentication processing (steps S41 and S42) is executed. The personal authentication processing is authentication processing for determining whether the user using the tablet device 10 is an authorized user registered in the tablet device 10 in advance. The personal authentication processing is executed by the firmware (the BIOS or the embedded OS).

If the network authentication processing and the device authentication processing succeed, the firmware executes the personal authentication processing (step S41). As the person authentication processing, a fingerprint authentication processing for determining whether or not an input fingerprint conforms to a fingerprint registered in advance in the tablet device 10 may be applied. Alternatively, as the personal authentication processing, an NFC authentication processing for determining whether personal information read from an NFC card conforms to personal information registered in advance in the tablet device 10 may be applied.

Then, the firmware confirms whether the personal authentication processing succeeds or not (step S42). If the personal authentication processing does not succeed, the firmware displays an authentication error message on the screen of the tablet device 10 (step S33). Also, the firmware turns off the power of the tablet device 10 (shutdown) (step S34).

The flowchart of FIG. 7 shows a procedure of a network monitoring processing to be executed by the tablet device 10 after the VDI connection is established.

In the network monitoring processing, for example, the embedded OS may monitor a connection state between the management server 20 and the tablet device 10 by repeatedly executing the communication with the management server 20. Alternatively, in the network monitoring processing, for example, the additional software may monitor a connection state between the VDI server 30 and the tablet device 10 by repeatedly executing the communication with the VDI server 30.

The following explanation is given with respect to the case where the embedded OS monitors the connection state between the management server 20 and the tablet device 10.

For example, the embedded OS may acquire the network address (IP address) of the management server 20, and then repeatedly transmit a command to check whether the management server 20 and the tablet device 10 are connected to each other or not to the management server 20. As this command, a Ping command may be applied.

The embedded OS determines whether the IP address of the management server 20 is acquired or not (step S51). If the IP address of the management server 20 is acquired (YES in step S51), the embedded OS determines whether a response made from the management server 20 in response to the command is present or not (step S52).

If the IP address of the management server 20 cannot be acquired (NO in step S51) or no response from the management server 20 can be received (NO in step S52), the embedded OS determines whether a counter starts or not (step S53). The counter is a counter for measuring time for which the communication between the management server 20 and the tablet device 10 is stopped.

If the counter does not start (NO in step S53), the embedded OS starts the counter (step S54). Then, the process returns to step S51.

On the other hand, if the counter starts (YES in step S53), the embedded OS determines whether time elapsing from time at which the counter starts reaches threshold time (e.g., 30 seconds) or not, based on a count value of the counter (step S55). If the time elapsing from the time at which the counter starts does not reach the threshold time (e.g., 30 seconds) (NO in step S55), the process returns to step S51. If the time elapsing from the time at which the counter starts reaches the threshold time (e.g., 30 seconds) (YES in step S55), the embedded OS determines that the connection between the tablet device 10 and the management server 20 is released, and instructs the BIOS to turn off the power of the tablet device 10 (step S56). The BIOS thus turns off the power of the tablet device 10 (step S57).

If the IP address of the management server 20 is acquired (YES in step S51) and a response from the management server 20 is received (YES in step S52), the embedded OS determines whether the counter starts or not (step S58). If the counter starts (YES in step S58), the embedded OS resets the counter to zero the count value of the counter (step S59). Then, the process returns to step S51.

Although the above explanation is given with respect to the case where the embedded OS determines whether the connection between the tablet device 10 and the management server 20 is released or not, the additional software may determine whether the connection between the tablet device 10 and the VDI server 30 is released or not, following the same procedure as shown in FIG. 7.

Alternatively, using the above counter, the additional software may determine whether time for which reception of a virtual desktop image from the VDI server 30 is stopped reaches threshold time or not. If the additional software detects that the time for which reception of the virtual desktop image from the VDI server 30 is stopped reaches the threshold time, the embedded OS instructs the BIOS to turn off the power of the tablet device 10. The BIOS thus turns off the power of the tablet device 10.

FIG. 8 shows a configuration example of the tablet device 10.

In addition to the above RAM (main memory) 113 and the BIOS-ROM 116, the tablet device 10 comprises a CPU 111, a system controller 112, a graphics processing unit (GPU) 114, a touch screen display 115, a wireless LAN module 117, a trusted platform module (TPM) 118, an embedded controller (EC) 119 and a GPS sensor 120. Furthermore, the tablet device 10 may comprise a fingerprint sensor 121 which detects a fingerprint of the user and an NFC controller 122 which executes communication with an external device such as an NFC card.

The CPU 111 is a processor configured to execute the firmware stored in the BIOS-ROM 116 and various kinds of programs downloaded into the RAM (main memory) 113.

The system controller 112 is a bridge device which connects the CPU 111 and each of components. The GPU 114 is a display controller configured to control the touch screen display 115, which is used as a display monitor of the tablet device 10. From display data stored in a video memory (VRAM), the GPU 114 produces a display signal to be supplied to the touch screen display 115. A part of memory area of the RAM (main memory) 113 may be used as the VRAM. The GPU 114 may be incorporated in the CPU 111.

The wireless LAN module 117 is a wireless communication controller which executes wireless communication compliant with IEEE 802.11. The embedded controller (EC) 119 functions as a power supply controller configured to execute power management for turning on or off the power of the tablet device 10.

It should be noted that the tablet device 10 may have a client mode in which it functions as a thin client (zero client) using the BIOS-based VDI, and a PC mode in which it functions as an ordinary tablet computer (or an ordinary notebook-sized personal computer). In this case, the user can make the tablet device 10 operate in either the client mode or the PC mode by operating a mode changing switch provided at the tablet device 10.

The tablet device 10 may comprise an internal storage such as an HDD or an SSD. In the internal storage, a general-purpose operating system and some application programs are installed. When the tablet device 10 is turned on, the BIOS determines whether the tablet device 10 is set in the PC mode or the client mode.

If the tablet device 10 is set in the PC mode, the BIOS boots the general-purpose operating system from the internal storage, not the embedded OS.

On the other hand, if the tablet device 10 is set in the client mode, the BIOS boots the embedded OS. The general-purpose operating system is not used. Furthermore, in the case where it comprises the internal storage, if it is set in the client mode, use of the internal storage may be inhibited by the BIOS in order to prevent information from being stored in the internal storage.

As explained above, according to the embodiment it is possible to prevent an information leak without limiting the kind of VDI connection software (client program) which can be made to run on the tablet device 10.

Also, not only the VDI connection software (client program), but an additional program configured to determine whether the tablet device 10 is disconnected from the network or not can be downloaded from the management server 20 into the RAM 113 of the tablet device 10. It is therefore possible to easily detect that the tablet device 10 is disconnected from the network, without the need to store in advance in the BIOS-ROM 116, a specific program for detecting disconnection from the network.

Furthermore, since the device authentication processing is executed by the management server 20, a device not registered in the management server 20 (i.e., an unauthorized device) cannot execute connection with the network. Therefore, it is possible to prevent use of an unauthorized device.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operation control method of controlling an operation of an information processing device executed by firmware stored in a ROM in the information processing device, the operation control method comprising:
connecting the information processing device to a first server through a network;
downloading a client program and connection target information from the first server into a volatile memory in the information processing device, the connection target information including an address of a second server which provides a virtual desktop environment, the client program configured to communicate with the second server by using the connection target information, to receive a virtual desktop image from the second server, and to transmit data inputted from an input device to the second server;
launching the client program in order to connect the information processing device to the second server through the network and execute a communication for desktop virtualization, the communication for the desktop virtualization comprising receiving the virtual desktop image from the second server and transmitting data inputted from the input device to the second server; and
turning off the power of the information processing device to erase the client program and the connection target information in the volatile memory, when the information processing device is disconnected from the network during a time period in which the communication for the desktop virtualization is executed.

2. The operation control method of claim 1, further comprising:
downloading an additional program from the first server into the volatile memory, the additional program configured to determine whether the information processing device is disconnected from the network.

3. The operation control method of claim 2, wherein the additional program is configured to detect whether the connection between the information processing device and the second server is released to determine whether the information processing device is disconnected from the network.

4. The operation control method of claim 1, further comprising:
periodically communicating with the first server during the time period in which the communication for the desktop virtualization is executed; and
determining that the information processing device is disconnected from the network during the time period, on condition that the communication between the first server and the information processing device is unable to perform for a first time period or more.

5. An information processing device comprising:
a processor;
a volatile memory; and
a ROM storing firmware including a basic input output system (BIOS),
wherein the processor is configured to execute firmware instructions of:
connecting the information processing device to a first server through a network;
downloading a client program and connection target information from the first server into the volatile memory, the connection target information including an address of a second server which provides a virtual desktop environment, the client program configured to communicate with the second server by using the connection target information, to receive a virtual desktop image from the second server, and to transmit data inputted from an input device to the second server;
launching the client program in order to connect the information processing device to the second server through the network and execute a communication for desktop virtualization, the communication for the desktop virtualization comprising receiving the virtual desktop image from the second server and transmitting data inputted from the input device to the second server; and
turning off the power of the information processing device to erase the client program and the connection target information in the volatile memory, when the information processing device is disconnected from the network during a time period in which the communication for the desktop virtualization is executed.

6. The information processing device of claim 5, wherein the processor is further configured to execute firmware instructions of downloading an additional program from the first server into the volatile memory, the additional program configured to determine whether the information processing device is disconnected from the network.

7. The information processing device of claim 6, wherein the processor is further configured to execute firmware instructions to detect whether the connection between the information processing device and the second server is released to determine whether the information processing device is disconnected from the network.

8. The information processing device of claim 6, wherein the processor is further configured to execute firmware instructions to detect whether the reception of the virtual desktop image from the second server is discontinued for more than or equal to a threshold time to determine whether the information processing device is disconnected from the network.

9. The information processing device of claim 5, wherein the processor is further configured to execute firmware instructions to detect whether the information processing device is disconnected from the network.

10. The information processing device of claim 5, wherein the processor is further configured to execute firmware instructions of transmitting the device identification information of the information processing device to the first server, in order for the first server to execute authentication processing for determining whether the information processing device is registered in the first server.

11. The information processing device of claim 5, wherein the processor is further configured to execute firmware instructions of acquiring credential information from the first server, for logging in the second server, and
the client program logs in the second server, using the credential information.

12. The information processing device of claim 5, wherein the firmware includes an embedded operating system and the BIOS both of which are stored in the ROM.

13. The information processing device of claim 5, wherein the processor is further configured to execute firmware instructions of:
periodically communicating with the first server during the time period in which the communication for the desktop virtualization is executed; and
determining that the information processing device is disconnected from the network during the time period, on condition that the communication between the first server and the information processing device is unable to perform for a first time period or more.

* * * * *